March 3, 1964    R. C. BROOKS    3,123,078
LUBRICATED VALVE WITH MEANS TO RELIEVE SEALANT PRESSURE
Filed May 12, 1961
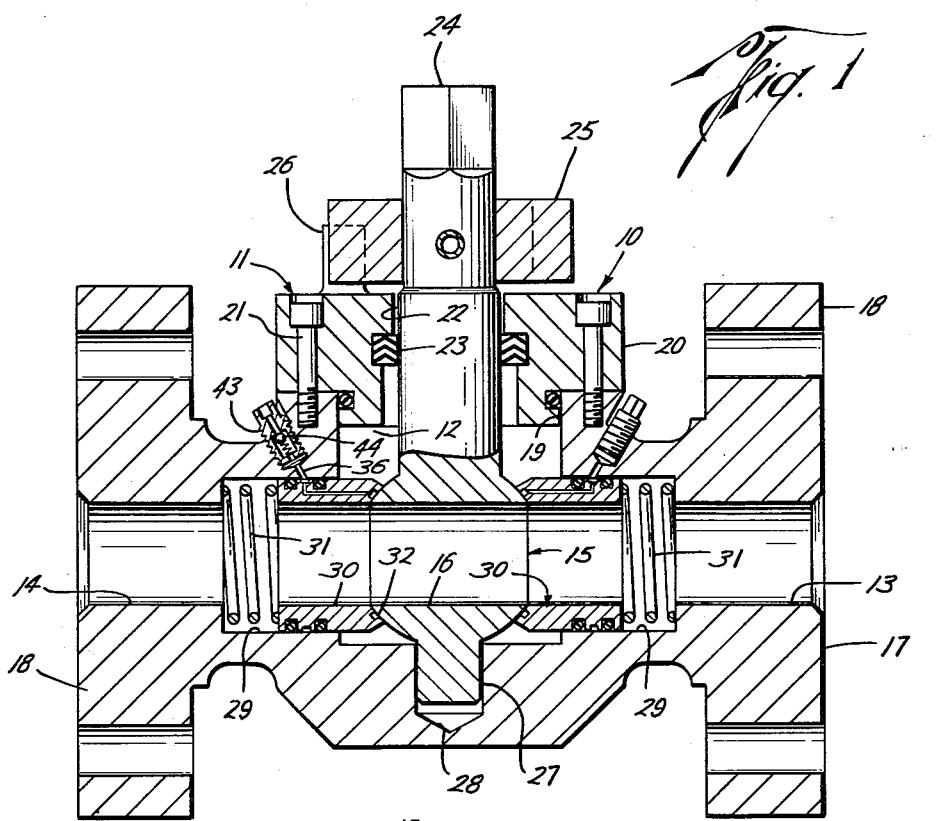
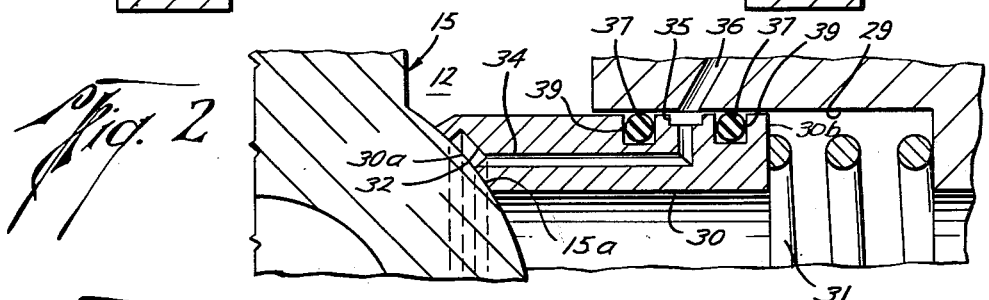
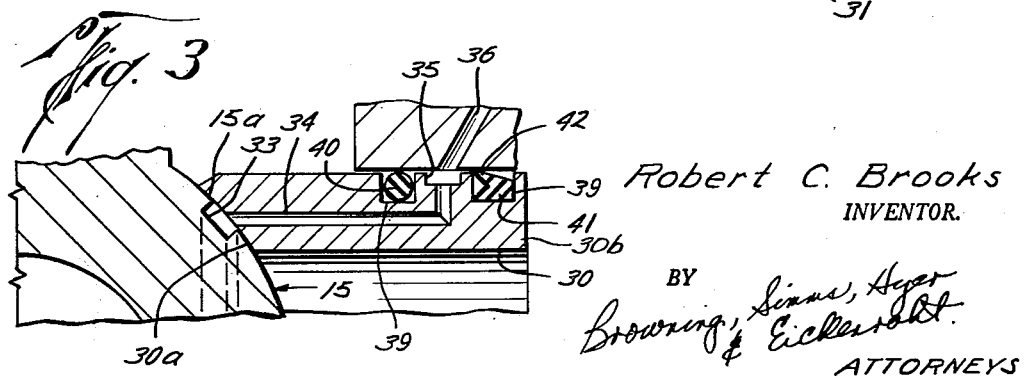
Robert C. Brooks
INVENTOR.
BY Browning, Simms, Ayer & Eickenroht
ATTORNEYS 3,123,078
LUBRICATED VALVE WITH MEANS TO RELIEVE
SEALANT PRESSURE
Robert C. Brooks, Houston, Tex., assignor to Cameron
Iron Works, Inc., Houston, Tex., a corporation of Texas
Filed May 12, 1961, Ser. No. 109,777
2 Claims. (Cl. 137—246.22)

This invention relates generally to valves having seat members which are urged into engagement with the valve member by line pressure and in which a film of sealant in the form of a lubricant or plastic provides a seal between each seat member and the valve member.

Usually, a valve of this type has a sealant system which includes an external fitting on the valve body for introducing the sealant under pressure into a groove between the seat and valve member. This fitting, and particularly the pressure of the sealant, is under the control of a maintenance man who supplies or replenishes the sealant as needed.

These prior sealant systems have been unsatisfactory from a commercial standpoint for one or more reasons. In many cases, the valve is susceptible of over-lubrication at the whim of the maintenance man. Thus, for example, in the event the sealant system is so arranged that the pressure of the sealant augments the line pressure in urging the seat member against the valve member, the resultant force on the valve member may be so great as to make it hard to operate. The sealant system may also be of such design that excessive sealant pressure can deform or collapse the seat member radially inwardly, thereby rendering the valve inoperable. In still other sealant systems, the seat member is restrained against rotational movement, thereby complicating its assembly and replacement, and further preventing it from being moved between different rotational positions so as to distribute the wear thereabout, as in valves of the type shown in U.S. Patent No. 2,977,975.

An object of this invention is to provide a valve of this type having a sealant system so designed as to prevent the valve from being over-lubricated and, at the same time, to facilitate assembly and replacement of the seat member and permit the wear on such seat to be distributed thereabout.

A more particular object is to provide a valve having such a sealant system in which there is substantially no resultant axial force due to sealant pressure on the seat, in which the sealant pressure is relieved prior to deformation or collapse of the seat, and in which the seat is free to rotate about its axis.

These and other objects are accomplished, in accordance with the illustrated embodiment of the invention shown in the drawings, by a valve having a system for injecting sealant into an annular groove between a seat and the valve member which includes a space sealed off between the seat and the body of the valve in which the seat is mounted. A passageway through the seat connects this space with the sealant groove, and a port in the valve body connects with the space for injecting the sealant into the passageway and groove. More particularly, the annular space is sealed off in such a manner that the sealant pressure in said space is balanced in an axial direction, and the seat is free to move axially as well as rotatably about its axis.

However, it may be found that, upon the injection of sealant into the annular space under high pressure, the radial compressive force on the seat ring will be of sufficient magnitude to collapse it. Thus, in accordance with the present invention, the area of the sealant groove between the inner end of the seat and the valve member is of a size to define a force sufficient for moving the seat and valve member apart before the pressure of the sealant would otherwise be sufficient to collapse the seat ring. Obviously, as the seat and valve member are separated, the sealant may escape to relieve the pressure of same to a safe value. The area of the groove to be provided for this purpose may be computed with relative ease for each valve of predetermined size and pressure rating.

In the drawings, wherein like reference characters are used throughout to designate like parts:

FIG. 1 is a longitudinal cross-sectional view of a rotary ball-type valve constructed in accordance with the present invention, and with the valve member in open position;

FIG. 2 is an enlarged view of part of the upstream seat of the valve of FIG. 1 in engagement with the valve member in the closed position of the latter; and FIG. 3 is a view similar to FIG. 2, but showing a modification of the valve of FIGS. 1 and 2 wherein the sealant groove is disposed in the valve member rather than in the seat.

With particular reference to the above-described drawings, the valve 10 of FIG. 1 comprises a valve body 11 having a flowway therethrough formed by a chamber 12 intermediate an inlet 13 thereto and outlet 14 therefrom. A ball-shaped valve member 15 having a passageway 16 therethrough is rotatable within the chamber 12 between positions aligning its passageway with the inlet and outlet to open the flowway, as shown in FIG. 1, and disposing a solid portion thereof across the inlet and outlet to close the flowway, as shown in FIGS. 2 and 3.

The valve body 11 comprises a lower portion 17 having flanges 18 at each end for connection in a line and an opening 19 from the top side of the chamber 12. This latter opening is closed by a bonnet 20 releasably connected to the lower body portion 17 by means of bolts 21 or the like. A stem 22 on the valve member 15 extends through packing 23 carried by the bonnet 20, and has an actuating part 24 on its outer end to enable the valve member to be rotated between opened and closed positions. The valve member is located in its alternate positions by any conventional means arranged on the stem and bonnet of the valve body, such as wings 25 on the stem engageable with stops 26 on the upper side of the bonnet. The valve member has a pintle 27 on its lower end received within a recess 28 in the valve body, and both the stem 22 and pintle may be received within suitable anti-friction bearings (not shown) to take the upstream thrust of the valve member in its closed position.

The inlet and outlet of the valve body are provided with counterbored portions 29 each to receive an annular seat 30 axially slidable within such portion for engagement at its inner end 30a with one side of the valve member 15. More particularly, each seat is urged into engagement with the valve member by means of a coil spring 31 disposed between the outer end 30b of each seat and the end of the recessed portion of each of the inlet and outlet. As shown, the inside diameters of the seats form continuations of the passageway 16 and inlet and outlet 13 and 14.

Although the right-hand end of the flowway through the valve body has been designated the inlet, obviously this duplication of the seats 30 permits reversal of flow—i.e., the left-hand end of the flowway may instead be the inlet. Each seat is sealably slidable within its inlet or outlet, as will be described more fully hereinafter, so that when the valve member has been moved to the closed position of FIGS. 2 and 3, the inner end 30a of the seat 30 on the upstream side of the valve member is urged into engagement with a seating surface 15a thereon by the force of the spring 31 as well as by upstream line fluid acting over its outer end 30b. As well known in the art, the downstream seat may also be pressure actuated by either upstream or downstream pressure.

As in previous valves of this type, there is an annular sealant groove between the seating surfaces 15a and 30a on the valve member and seat, respectively. In the embodiment of the valve shown in FIGS. 1 and 2, a groove 32 is formed in the inner end of the seat 30, while in the embodiment of the valve shown in FIG. 3, a groove 33 is formed in the seating surface of the valve member. In each embodiment, the groove is connected to the inner end of a passageway 34 through the seat which connects at its opposite end with an annular groove 35 surrounding the outer side of the seat. This passageway connects with a sealed off annular space between the seat and the inlet counterbored portion 29, which is, in turn, connected to the inner end of a port 36 in the valve body through which sealant may be introduced into the aforementioned grooves 32 or 33.

In the valve shown in FIGS. 1 and 2, this sealed off space is defined between axially spaced-apart O-rings 37 received within annular grooves 39 about the seat. In the valve shown in FIG. 3, the inner sealing ring also comprises an O-ring 40, while the outer sealing ring 41 has inwardly facing and outwardly flared lips 42 thereon sealably engageable with the inlet counterbored portion 29 of the valve body and the bottom of the groove 39 in which it is disposed. As will be described below, this provides a check valve which enables the sealant to be activated by line pressure. In both cases, however, the sealing rings provide a sliding seal between the seat and body along equal diameter portions, so that the sealant pressure in the annular space is balanced in an axial direction and there is no resultant sealant force urging the seat against the valve member.

Sealant is injected into the port 36 through a conventional one-way check valve 43 having an outwardly spring-pressed ball 44 therein. In both embodiments of the valve, the sealant is normally injected through the check valve 43, port 36, and passageway 34 into the sealant groove at a pressure higher than that of the line fluid to be sealed. Thus, gas and other fluids in the line will be held against escape past the film of sealant within the groove between the seat and valve member. In the case of the valve shown in FIG. 3, the sealing ring 41 will exclude line pressure from the annular space only so long as the sealant pressure is higher than that of the line fluid. In the event, however, that the pressure of the line fluid rises above that of the sealant, it will flow past the outer lip 42 into the annular sealant space so that the sealant will always be at a pressure at least as high as that of the line fluid.

Upon assembly of the valve, each seat 30 may be moved through the chamber opening 19 into inlet and outlet counterbored portions 29 in any rotational position about its axis. That is, it need only be oriented axially with respect to the valve body. Also, the seat is free to rotate about its axis during operation of the valve, as by any suitable mechanism of the type shown in the aforementioned Patent No. 2,977,975.

Still further, and as best shown in FIG. 1, each seat is axially slidable within the valve body a distance sufficient to permit the valve member 15 to be inserted and removed from between the seats. That is, each seat is movable outwardly from the position shown in FIG. 1, and against the force of the spring 31, a distance at least as great as the interference between the inner end of the seat and the valve member in the open position of the latter.

As previously mentioned, the sealant within the sealed off annular space about each seat will define a force tending to collapse the seat inwardly. This force is, of course, opposed by an oppositely disposed force due to the line fluid acting radially outwardly against the inside of each seat. Thus, the resultant collapsing force on each seat is proportional to the differential pressure of the sealant and line fluid.

As also mentioned heretofore, this invention contemplates that the sealant within sealant groove 32 or 33 will be relieved before the collapsing force on the seat rises to a predetermined value which would otherwise collapse the seat. For this purpose, each sealant groove has an area which will define a force due to the sealant sufficient to move the seat axially away from the valve member before the aforementioned predetermined collapsing force is reached. Again, as previously mentioned, this required area of sealant groove may be easily computed since the force required for separating the seat from the valve member is simply related to the differential pressure of the sealant and line fluid.

As will be understood from the drawings, the sealant acts upon an effective pressure area of the sealant groove to provide an outwardly directed force which is opposed by an inwardly directed force due to line pressure acting upon the outer end 30b of the seat. Thus, ignoring the relatively small force due to the spring 31, the ratio of the area of the groove to the area of the end 30b of the seat which is necesary to separate the seat from the valve member upon the occurrence of a predetermined pressure differential across the annular space is inversely proportional to the ratio of the sealant pressure to the line pressure. For example, if, in a valve which is designed to withstand a maximum pressure of 1,000 p.s.i., it is known that the differential across the seat is not to exceed 500 p.s.i., the required area of groove is two thirds that of the outer end of the seat (1,000 p.s.i./1,500 p.s..i.).

The loss of sealant from the groove is relatively small because the relief provided by the separation of the seat from the valve member occurs only so long as the differential pressure exceeds the predetermined value. When the relief permits the differential to drop to such value, the seat will move back to seated engagement with the valve member.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense. Thus, for example, the valve need not be a plug type, much less one having a ball-shaped valve member. Furthermore, the valve member may be free-floating, rather than fixed to pintles, and, as previously mentioned, the seat may seal upstream or downstream of the valve member.

The invention having been described, what is claimed is:

1. A valve, comprising a valve body having a flowway therethrough and a chamber therein intersecting the flowway, a valve member in the chamber, means for moving the valve member between opened and closed positions, an annular seat slidably mounted in the flowway for engagement at its inner end with the valve member, a first seal ring carried by one of the body and seat to seal therebetween, a second seal ring carried by one of the body and seat to seal therebetween at a location more distant from the inner end of the seat than said first seal ring, a sealant injection port in the valve body connecting with the flowway intermediate the seal rings, a passageway through the seat connecting the outer side thereof intermediate said seal rings and the inner end thereof, said seal rings providing a seal between the seat and body along substantially equal diameter portions of the seat so that, upon injection of sealant, the force on the seat due to sealant pressure intermediate said seal rings is balanced in an axial direction, and an annular groove connecting with said passageway between said inner end of the seat and valve member to receive sealant for sealing between said seat and valve member and to relieve said sealant when the said sealant pressure exceeds the line fluid pressure within said flowway on the same side of the valve member as said seat a predetermined value.

2. A valve of the character defined in claim 1, wherein the second seal ring has an inwardly facing lip to permit said line fluid pressure to pressurize the sealant.

References Cited in the file of this patent

UNITED STATES PATENTS

| | | |
|---|---|---|
| 2,030,458 | McKellar | Feb. 11, 1936 |
| 2,747,600 | Laurent | May 29, 1956 |
| 2,788,015 | Scherer | Apr. 9, 1957 |
| 2,796,230 | Grove et al. | June 18, 1957 |
| 2,932,311 | Scherer | Apr. 12, 1960 |
| 3,078,865 | Estes et al. | Feb. 26, 1963 |

FOREIGN PATENTS

| | | |
|---|---|---|
| 860,072 | Great Britain | Feb. 1, 1961 |